United States Patent
Wang et al.

(10) Patent No.: US 12,314,984 B2
(45) Date of Patent: May 27, 2025

(54) METHOD AND APPARATUS FOR DISPLAYING PRODUCT REVIEW INFORMATION, ELECTRONIC DEVICE AND STORAGE MEDIUM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Yingshuai Wang, Beijing (CN); Xiaoxia Li, Beijing (CN); Shiyu Miao, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 209 days.

(21) Appl. No.: 17/635,016

(22) PCT Filed: Mar. 27, 2020

(86) PCT No.: PCT/CN2020/081573
§ 371 (c)(1),
(2) Date: Feb. 14, 2022

(87) PCT Pub. No.: WO2021/036250
PCT Pub. Date: Mar. 4, 2021

(65) Prior Publication Data
US 2022/0292587 A1    Sep. 15, 2022

(30) Foreign Application Priority Data
Aug. 29, 2019   (CN) .......................... 201910807718.4

(51) Int. Cl.
G06Q 30/00     (2023.01)
G06F 40/30     (2020.01)
G06F 40/44     (2020.01)
G06Q 30/0282   (2023.01)
G06Q 30/0601   (2023.01)

(52) U.S. Cl.
CPC ......... G06Q 30/0282 (2013.01); G06F 40/30 (2020.01); G06F 40/44 (2020.01); G06Q 30/0641 (2013.01)

(58) Field of Classification Search
CPC ...................... G06Q 30/0282; G06Q 30/0641; G06F 40/30; G06F 40/44
(Continued)

(56) References Cited

U.S. PATENT DOCUMENTS 10,242,105 B2 *   3/2019   Du ........................ G06F 16/951
2004/0254904 A1*  12/2004  Nelken .................. G06N 5/022
                                                          706/50
(Continued)

FOREIGN PATENT DOCUMENTS

CN    104462509 A    3/2015
CN    105095181 A    11/2015
(Continued)

OTHER PUBLICATIONS

"Critical Product Features' Identification Using an Opinion Analyzer," Shamim, Azra; Balakrishnan, Vimala; Tahir, Muhammad; Muhammad Shiraz. The Scientific World Journal2014 Hindawi Limited. (2014); Dialog, 9pgs. (Year: 2014).*
(Continued)

Primary Examiner — Robert M Pond
(74) Attorney, Agent, or Firm — Qinghong Xu

(57) ABSTRACT

Disclosed by the present disclosure are a method and apparatus for displaying product comment information, an electronic device and a storage medium. The method for displaying product comment information is executed by a
(Continued)

server and specifically comprises: acquiring product comment information of a user, the product comment information comprising comment text; inputting the comment text into a first model established in advance for error correction processing; determining whether the product comment information further comprises a comment image; if the product comment information comprises a comment image, then inputting the error-corrected comment text and the comment image together into a second model established in advance to detect the consistency of the image and the text, and when the image and the text are detected to be consistent, saving the product comment information in a display list; if the product comment information does not comprise a comment image, then directly saving the error-corrected comment text in the display list; and displaying the product comment information in the display list to the user.

15 Claims, 11 Drawing Sheets

(58) Field of Classification Search
USPC .................................................... 705/26, 27
See application file for complete search history.

(56) References Cited

U.S. PATENT DOCUMENTS

| | | | | |
|---|---|---|---|---|
| 2008/0071602 | A1* | 3/2008 | Ojakaar | G06Q 30/0629 |
| | | | | 705/306 |
| 2014/0379682 | A1* | 12/2014 | Du | G06F 16/9535 |
| | | | | 707/706 |
| 2016/0070709 | A1 | 3/2016 | Luan et al. | |
| 2017/0139921 | A1* | 5/2017 | Ball | G06F 16/24578 |
| 2018/0189593 | A1* | 7/2018 | DeLuca | G06F 18/2178 |
| 2018/0260860 | A1 | 9/2018 | Devanathan et al. | |
| 2019/0197423 | A1* | 6/2019 | Vigoda | G06F 18/24155 |

FOREIGN PATENT DOCUMENTS

| | | |
|---|---|---|
| CN | 107357775 A | 11/2017 |
| CN | 108363790 A | 8/2018 |
| CN | 108563765 A | 9/2018 |
| CN | 108959250 A | 12/2018 |
| CN | 109241379 A | 1/2019 |
| CN | 109345272 A | 2/2019 |
| CN | 109543512 A | 3/2019 |
| CN | 109885796 A | 6/2019 |
| CN | 109922371 A | 6/2019 |
| CN | 110084373 A | 8/2019 |
| CN | 110097010 A | 8/2019 |
| CN | 110097419 A | 8/2019 |

OTHER PUBLICATIONS

The International Search Report dated Jun. 30, 2020 for PCT international application No. PCT/CN2020/081573.
The 1st Office Action dated Jul. 11, 2022 for Indian Application No. 202237007919.
2nd Office Action dated Feb. 7, 2025 of Chinese Application No. 201910807718.4.

* cited by examiner

METHOD AND APPARATUS FOR DISPLAYING PRODUCT REVIEW INFORMATION, ELECTRONIC DEVICE AND STORAGE MEDIUM

CROSS-REFERENCE TO RELATED APPLICATIONS

The present disclosure is the U.S. national phase application of International Application No. PCT/CN2020/081573, filed on Mar. 27, 2020, which is based on and claims priority to Chinese Patent Application No. 201910807718.4, filed with the Chinese Patent Office on Aug. 29, 2019, titled "METHOD AND APPARATUS FOR DISPLAYING PRODUCT COMMENT INFORMATION, ELECTRONIC DEVICE AND STORAGE MEDIUM", which are incorporated herein by reference in their entireties for all purposes.

TECHNICAL FIELD

The present disclosure relates to the field of computer technology, and in particular, to a method for displaying product comment information, an apparatus, an electronic device and a storage medium.

BACKGROUND

With the development of E-commerce, more and more users buy products through E-commerce platforms. In order to increase the communication between merchants and users and provide more information for other users when purchasing products, E-commerce platforms usually set up a 'product comment area' on a product details page to display a large number of comments of the product by each user.

SUMMARY

An embodiment of the present disclosure proposes a method for displaying product comment information, which is executed by a server and includes: acquiring product comment information of a user, wherein the product comment information comprises a comment text; inputting the comment text into a pre-established first model for an error correction processing; determining whether the product comment information further comprises a comment image; in response to determining that the product comment information further comprises the comment image, inputting both of the error-corrected comment text and the comment image together into a pre-established second model for an image-text consistency detection, and in response to detecting that the error-corrected comment text and the comment image are consistent, saving the product comment information having the consistent comment text and comment image into a display list; in response to that the product comment information does not comprise the comment image, saving the error-corrected comment text directly in the display list; and displaying the product comment information in the display list to the user.

An embodiment of the present disclosure proposes a method for displaying product comment information, which is executed by a server and specifically includes: acquiring product comment information of a user, wherein the product comment information comprises a comment text; in response to that the product comment information further comprises a comment image, inputting both of the comment text and the comment image together into a pre-established first model for an image-text consistency detection, and in response to detecting that the comment text and the comment image are consistent, saving the product comment information having the consistent comment text and comment image into a display list; and returning the product comment information in the display list to a user terminal to display to the user.

An embodiment of the present disclosure proposes an apparatus for displaying product comment information. The apparatus may include: an input unit configured to acquire product comment information of a user, wherein the product comment information comprises a comment text; an error correction neural network model unit configured to input the comment text into a pre-established first model for an error correction processing; an image-text detection neural network model unit configured to perform an image-text consistency detection, and in response to detecting that the comment text and a comment image are consistent, save the product comment information having the consistent comment text and comment image into a display list of a storage unit; a determination unit configured to determine whether the product comment information comprises a comment image, in response to determining that the product comment information comprises the comment image, inputting both of the error-corrected comment text and the comment image together into a second model, and in response to determining that the product comment information does not comprise the comment image, saving the error-corrected comment text directly in the display list of the storage unit; the storage unit configured to store the display list; and a display unit configured to display the product comment information in the display list to the user.

An embodiment of the present disclosure further proposes an apparatus for displaying product comment information. The apparatus may include: an input unit configured to acquire product comment information of a user, wherein the product comment information comprises a comment text; an image-text detection neural network model unit configured to, in response to determining that the product comment information further comprises a comment image, input both of the comment text and the comment image together into a pre-established first model for an image-text consistency detection, and in response to detecting that the comment text and the comment image are consistent, save the product comment information having the consistent comment text and comment image into a display list of a storage unit; the product storage unit configured to store the display list; and a display unit configured to return the product comment information in the display list to a user terminal to display to the user.

An embodiment of the present disclosure proposes a computer-readable storage medium with a computer program executable by a computer device stored thereon, when the computer program is run on the computer device, the computer device implements steps of the method for displaying product comment information.

An embodiment of the present disclosure proposes an electronic device, comprising: a memory, a processor and a computer program stored in the memory and executable on the processor, when the processor executes the computer program, the processor implement steps of the method for displaying product comment information.

BRIEF DESCRIPTION OF THE DRAWINGS

In order to more clearly describe the technical solutions in the embodiments of the present disclosure, the following will briefly introduce the accompanying drawings used in the description of the embodiments. Obviously, the accompanying drawings in the following description are only some embodiments of the present disclosure, and for those of ordinary skill in the art, other drawings can be obtained from these drawings without creative labor.

DETAILED DESCRIPTION

In order to clearly and completely describe the technical solutions in the embodiments of the present disclosure, the following is described in combination with the accompanying drawings. It is obvious that the described embodiments are only a part of the embodiments of the present disclosure, rather than all the embodiments. Based on the embodiments in the present disclosure, all other embodiments obtained by those of ordinary skill in the art without creative efforts shall fall within the protection scope of the present disclosure.

The terms 'first', 'second', 'third', 'fourth', etc. (if any) in the description and claims of the present disclosure and the above-mentioned drawings are used to distinguish similar objects and are not necessarily used to describe a specific order or sequence. It is to be understood that the used data are interchangeable under appropriate circumstances such that the embodiments of the present disclosure described herein can, for example, be practiced in sequences other than those illustrated or described herein. Furthermore, the terms 'comprising' and 'having', and any variations thereof, are intended to cover non-exclusive inclusion. For example, a process, method, system, product or apparatus comprising a series of steps or units is not necessarily limited to those steps or units expressly listed, but may include steps or units not expressly listed or other steps or units inherent to such process, method, product or apparatus.

The technical solutions of the present disclosure will be described in detail below with specific examples. The following specific embodiments may be combined with each other, and the same or similar concepts or processes may not be repeated in some embodiments.

Figure 1A:
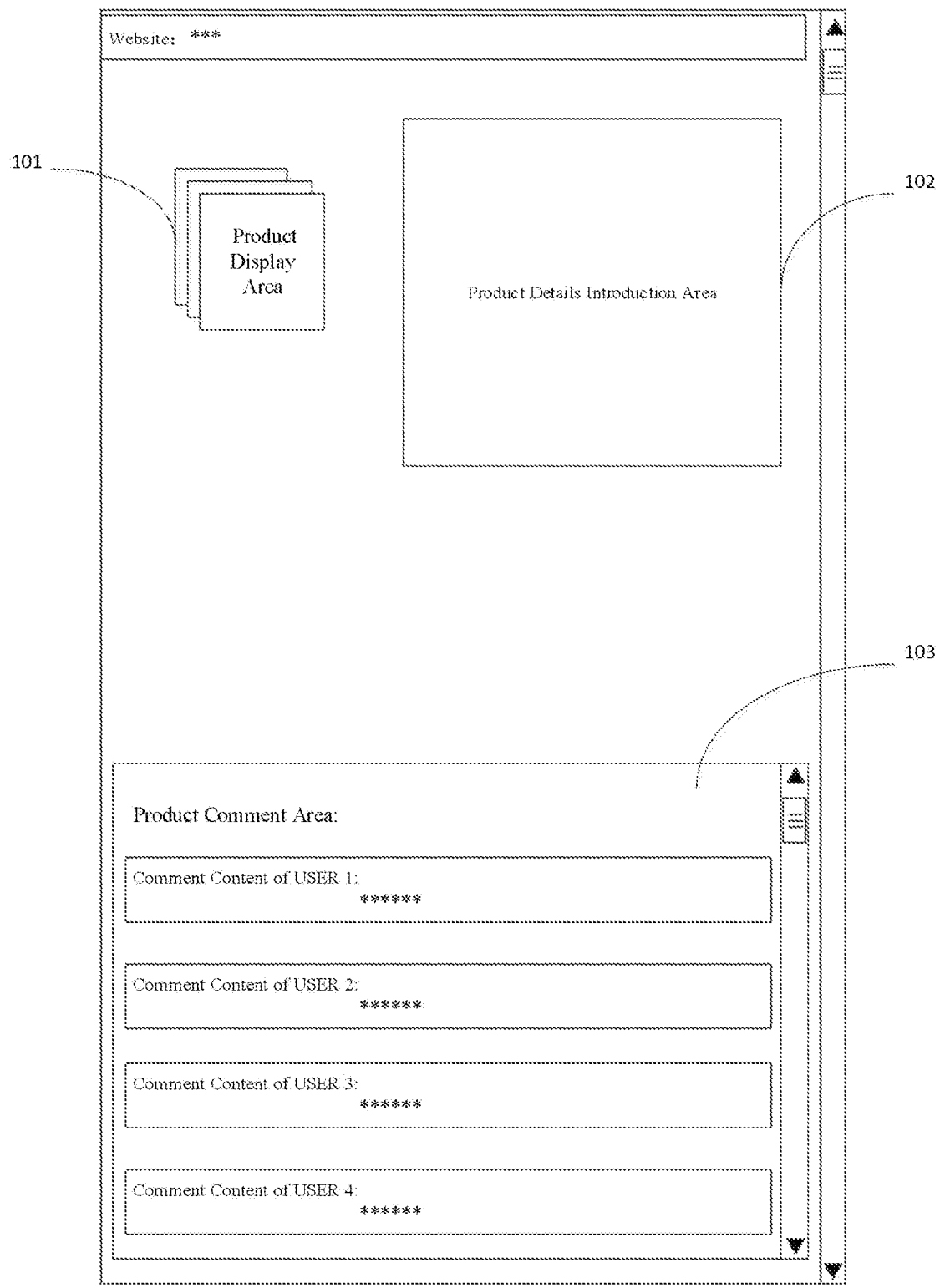
FIG. 1A is a schematic diagram of a product details page mode according to some embodiments of the present disclosure.

FIG. 1A is a schematic diagram of a product details page mode in some embodiments of the present disclosure. As shown in FIG. 1A, the product details page mode includes: a product display area 101, which usually uses pictures or videos to display the appearance or usage of the product; a product details introduction area 102, which usually introduces the price, performance, parameters and other information of the product in detail; and a product comment area 103, which usually displays the user's comments on the product. If there is a lot of contents in the product comment area, users who browse the page can display the comment content by pulling down the scroll bar or opening the folded area. In practical applications, there are many product comments, but not all of them are valuable to users. Users are needed to manually screen a large number of comments to find useful information for them. Therefore, the effective utilization of product comment information is reduced since there are a large number of spam comments, thus resulting in poor user experience.

In order to enable users to easily obtain valuable comment information, the embodiment of the present disclosure provides a method for displaying product comment information, which processes the product comment information first to screen out high-quality product comment information and display it to the user, and then make user to quickly obtain valuable product comment information, improve user experience, and improve the effective utilization of product comment information.

Figure 1B:
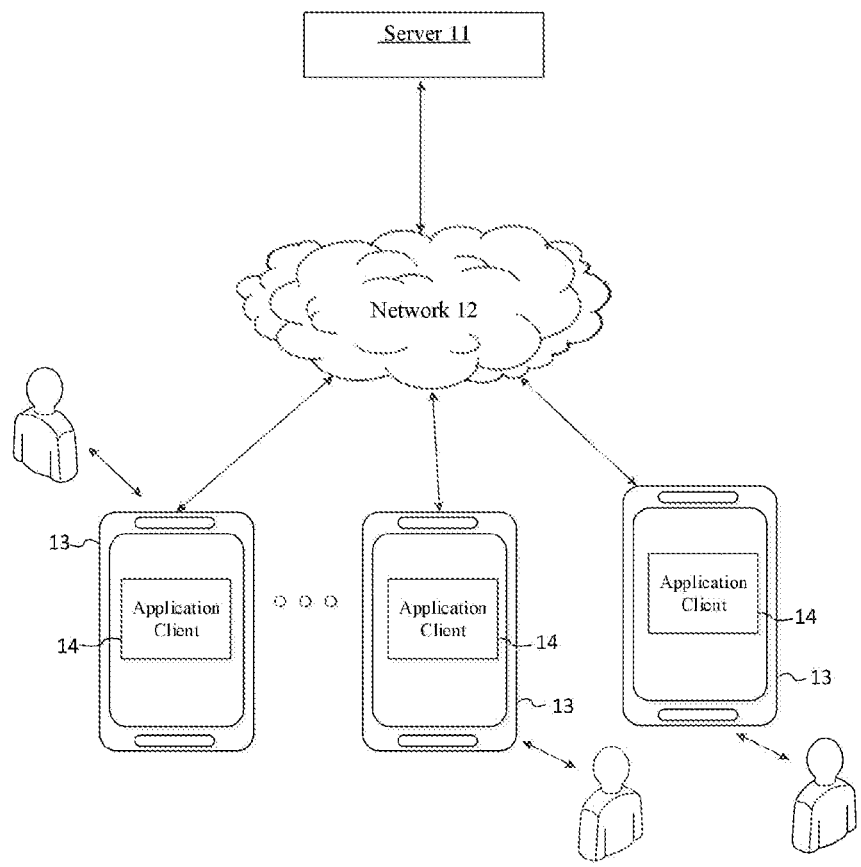
FIG. 1B is a schematic diagram of a system structure to which the method for displaying product comment information described in some embodiments of the present disclosure is applied.

FIG. 1B shows a schematic diagram of a system structure to which the method for displaying product comment information according to some embodiments of the present disclosure is applied. As shown in FIG. 1B, a system to which the method for displaying product comment information of the present disclosure is applicable at least includes a server 11, a network 12 and a user terminal 13.

In some examples of the present disclosure, the server 11 is a background server of an application client for the user to purchase products and comment on products. The server 11 provides services for the user together with the application client 14 in the user terminal 13. For example, in response to the product comment information sent by the application client 14 in the user terminal 11, the server saves the product comment information for subsequent analyzing and processing of the product comment information. The server 11 may be a single server or a cluster server composed of multiple servers.

Network 12 may include wired networks and wireless networks. As shown in FIG. 1B, on an access network side, the user terminal 13 can access the network 12 in a wireless manner or a wired manner; while on a core network side, the server 11 is generally connected to the network 12 in a wired manner. Of course, the above-mentioned server 11 may also be connected to the network 12 in a wireless manner.

The above-mentioned user terminal 13 may refer to a smart device with a data computing and processing function, including but not limited to a smart phone, a palmtop computer, a tablet computer, and the like, and a communication module is installed on them respectively. An operating system is installed on the user terminal 11 and the operating system includes, but not limited to, an Android operating system, a Symbian operating system, a Windows mobile operating system, an Apple iphone OS operating system, and the like. The user terminal 11 generally includes an application client 14 to enable the user to purchase products and to comment on the purchased products.

Figure 2A:
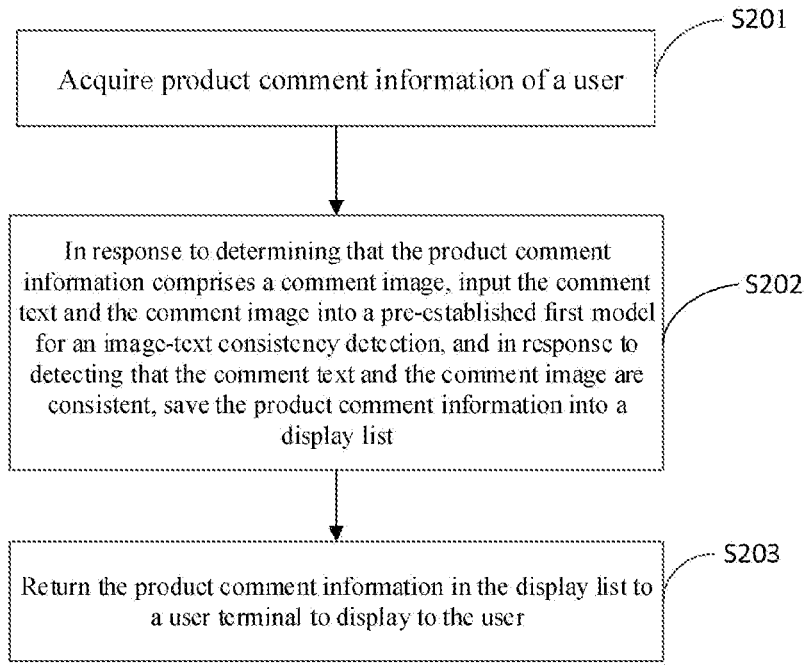
FIG. 2A is a flowchart 200A of a method for displaying product comment information according to some embodiments of the present disclosure.

Based on the system structure shown in FIG. 1B, an embodiment of the present disclosure provides a method for displaying product comment information, which is executed by the server 11. FIG. 2A is a flowchart of a method for displaying product comment information in embodiments of the present disclosure. As shown in FIG. 2A, the method includes the following steps.

At a step S201, product comment information of a user is acquired, wherein the product comment information includes a comment text.

In some embodiments, after acquiring original product comment information of the user, whether the product comment information further includes a comment image is determined.

At a step S202, when the product comment information further includes the comment image, both of the comment text and the comment image are together inputted into a pre-established first model (i.e., a first model established in advance) to perform an image-text consistency detection, and the detected image-text consistent product comments are stored in a display list, and the first model can also be called an image-text detection neural network model, which means a neural network model for an image and text consistency detection, wherein the detected consistent product comments refers to the detected product comments of which the image and the text are consistent.

In some embodiments, after acquiring the product comment information of the user, the comment text may be further input into a pre-established second model (i.e., a second model established in advance) for error correction processing; and both of the error-corrected comment text and the comment image are together inputted into the pre-established first model to perform the image-text consistency detection, wherein the second model can also be called a text error correction neural network model.

In some embodiments, when the product comment information does not include a comment image, the error-corrected comment text is directly saved in the display list.

At a step S203, the product comment information in the display list is returned to the user terminal, so that it can be displayed to the user.

By using the method for displaying product comment information provided in some embodiments of the present disclosure, the image-text consistency detection of the comment text and the comment image can be performed, so that the correctness of the product comment information including the image is improved, and the product comment information that has been passed the image and text consistency detection can be displayed to the user. Due to the relatively high quality of the product comment information displayed to the user, the utilization rate of the product comment information by the user will be correspondingly improved, thereby avoiding the waste of equipment resources and network resources caused by a large number of invalid product comment information, and greatly improving the user experience.

The method for displaying the product comment information provided by the examples of the present disclosure will be described in detail below with reference to the accompanying drawings through several embodiments.

Figure 2B:
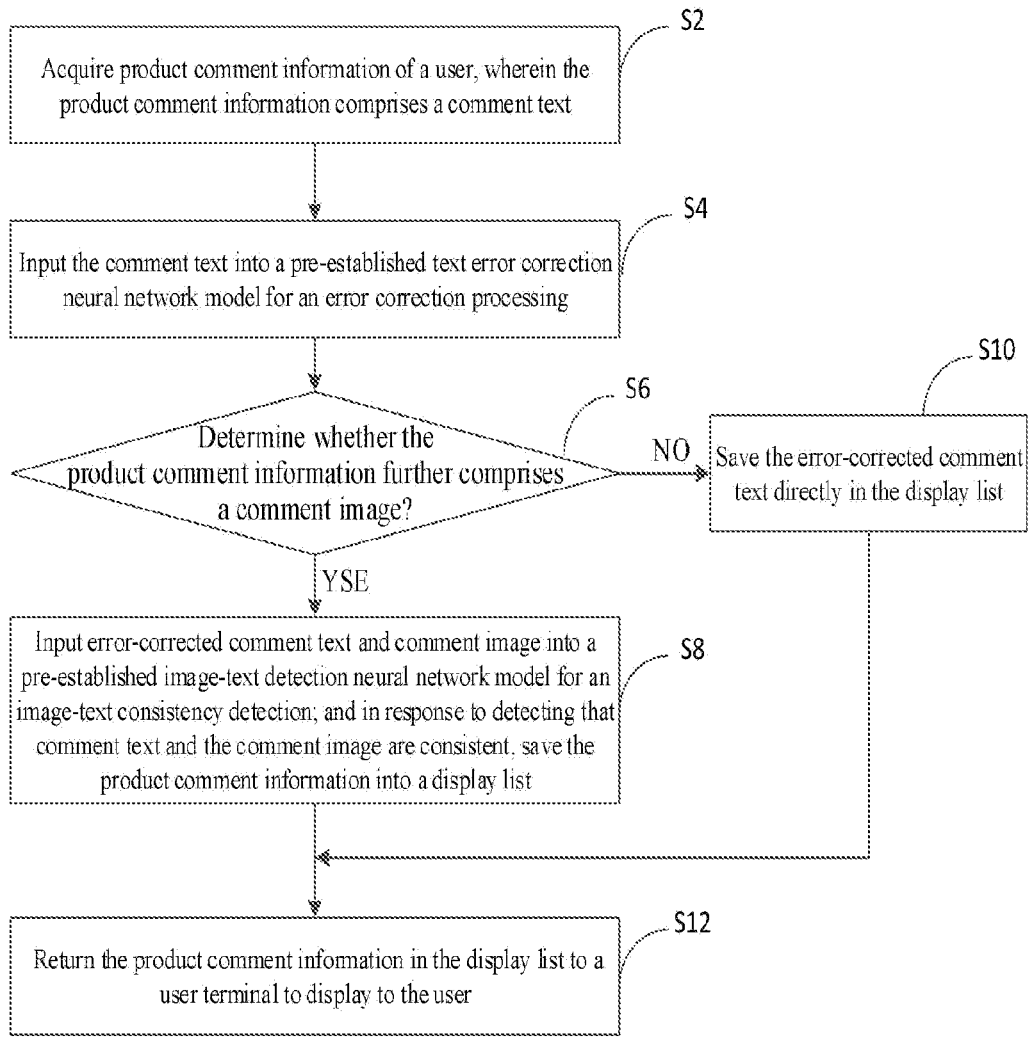
FIG. 2B is a flowchart 200B of a method for displaying product comment information according to some embodiments of the present disclosure.

FIG. 2B is a flowchart of a method for displaying product comment information in embodiments of the present disclosure. As shown in FIG. 2, the method includes the following steps.

At a step S2, product comment information of the user is acquired, wherein the product comment information includes a comment text.

The product comment information described herein is the comment information input by the user in advance; for example, the user may input product comment information in the product comment area 103 shown in FIG. 1. In this embodiment of the present disclosure, the product comment information can be acquired from this product comment area 103, and the following steps can be used to process the acquired product comment information. The product comment information refers to the content information of comments made by users on products, which can include comment texts and comment images. The comment text refers to a text portion entered by the user in the product comment area, such as Chinese, English or other non-Chinese characters, numbers, special characters, etc. The comment image refers to one or more images entered by the user in the product comment area, which are usually used for the user's display of the actual product.

It should be noted that there are many users who use the E-commerce platform. Users can either enter product comment information in the product comment area according to the situation of the product, or browse the product comment information of other users displayed on the E-commerce platform. For example, a user A enters product comment information about product X in the product comment area, and after the processing steps according to the embodiments of the present disclosure, the processed product comment information can be displayed to all other users for browsing. Therefore, the 'user' in this embodiment of the present disclosure may be a user who has entered product comment information (i.e., product comment information) (step S2), or may be a user who has browsed the displayed processed product comment information (step S12), which is irrelevant when implementing the technical scheme of the present disclosure, so they are collectively referred to as 'user' in the embodiments of the present disclosure.

At a step S4, the comment text is input into a text error correction neural network model established in advance, i.e., a pre-established text error correction neural network model, to perform error correction processing.

In this embodiment of the present disclosure, a text error correction neural network model can be established in advance for text error correction processing. The error correction neural network model described herein is a neural network algorithm for correcting text errors. For example, a long short memory network (LSTM) algorithm, a gated recurrent unit (GRU) algorithm, etc. can be used. In practical applications, due to the user's carelessness or other reasons leading to input errors, the readability of the comment text is poor, and the utilization value for other users is low. For this kind of situation, the embodiment of the present disclosure inputs the comment text into the text error correction neural network model for error correction processing, in order to obtain the correct comment text, and subsequently displays the correct comment text to the user. The text error correction neural network model will be described in detail in other subsequent embodiments, and will not be repeated here.

At a step S6, whether the product comment information further includes a comment image is determined, if the product comment information further includes the comment image, a step S8 is performed; and if the product comment information does not further includes the comment image, a step S10 is performed.

In practical applications, users can not only enter a text into the product comment area to comment on the product, but also enter an image to display the actual situation of the product, such as a photo of the product in use. For the case that the comment image is included and the case that the comment image is not included, the embodiments of the present disclosure use step S8 and step S10 to respectively process.

At a step S8, both of the error-corrected comment text and the comment image are together input into a pre-established image-text detection neural network model for the image and text consistency detection, and in response to detecting that the image and text are consistent, the product comment information is saved in the display list.

In practical applications, the comment text and comment images entered by the user into the product comment area may not be consistent. For example, the product purchased by a user is a mobile phone, but the comment image shows a landscape image, and the value-in-use of such comment content for other users is relatively low. Therefore, in this embodiment of the present disclosure, the error-corrected comment text and comment image together are input into the image-text detection neural network model for the image-text consistency detection, and only the product comment information that passes said consistency detection is saved in the display list, so as to facilitate the displaying to users later. The image-text detection neural network model described herein also belongs to a neural network algorithm, and the specific details will be described in detail in other subsequent embodiments, and will not be repeated herein.

At a step S10, the error-corrected comment text saved in the display list.

At a step S12, the product comment information in the display list is returned to the user terminal, so that it can be displayed to the user. In the embodiments of the present disclosure, since the text error correction is performed on the product comment information entered by the user, the correct comment text is obtained, and the consistency detection is performed on the image and the text, to filter out the product comment information inconsistent with the image and the text, thus improving the quality of the product comment information. After that, high-quality product comment information is displayed to users, so that users can quickly find valuable information, thereby improving user experience and increasing the utilization of product comment information.

In order to better illustrate the solution of the embodiments of the present disclosure, another embodiment is used for detailed description below. In this embodiment, the comment text can also be preprocessed to further increase the quality of the product comment information. In addition, it is also possible to set a text feature value, and then provide the user with a personalized display according to the text feature value.

Figure 3:
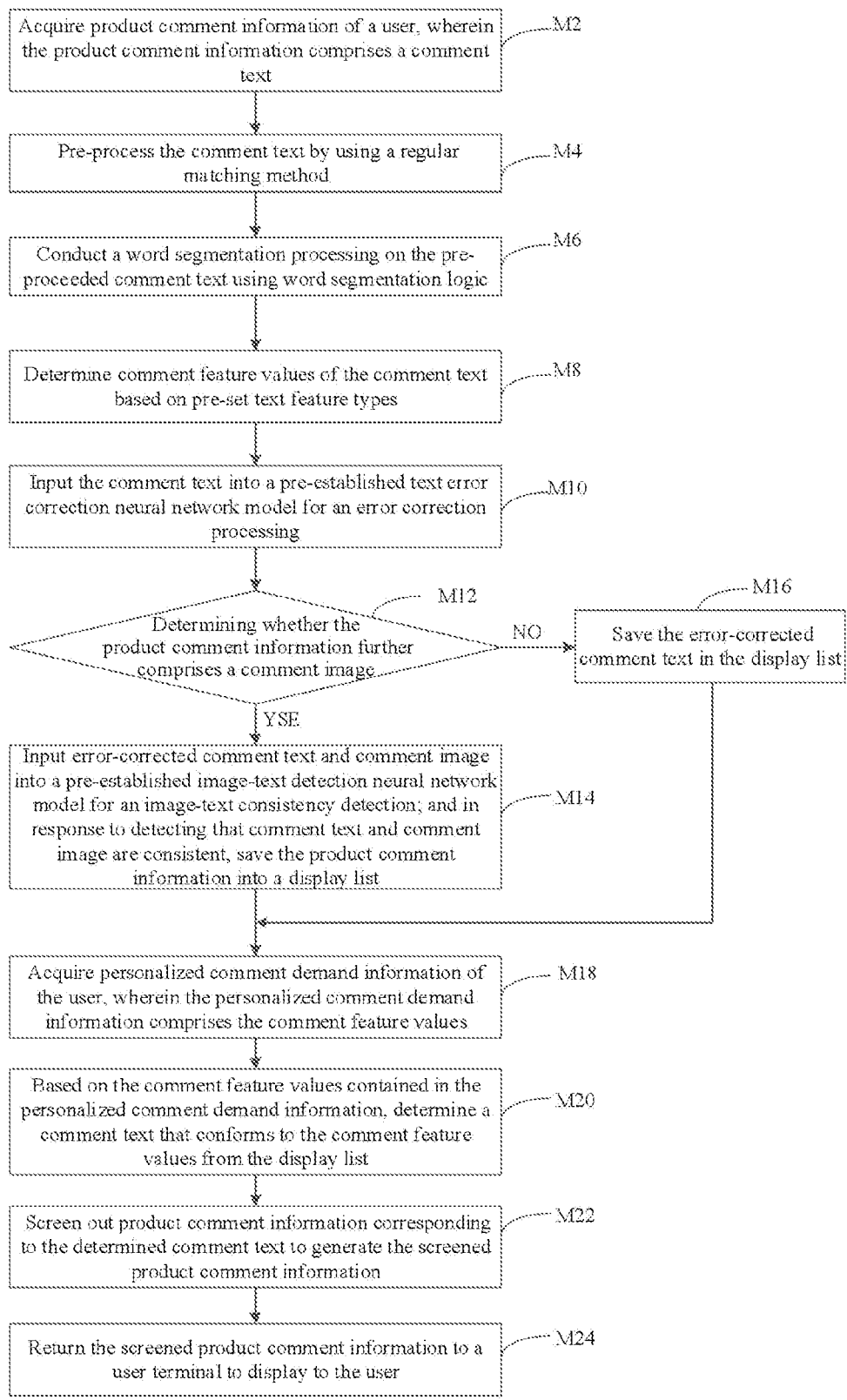
FIG. 3 is a flowchart 300 of a method for displaying product comment information according to another embodiments of the present disclosure.

FIG. 3 is a flowchart of a method for displaying product comment information according to some embodiments of the present disclosure. As shown in FIG. 3, the method includes the following steps.

At a step M2, product comment information of the user is acquired, wherein the product comment information includes a comment text.

This step is the same as the step S2 in the above-mentioned embodiment.

At a step M4, the comment text is preprocessed by using a regular matching method.

In practical applications, the comment text entered by the user may have other situations that affect the value-in-use, such as: the text contains sensitive words, the number of words in the text is too small, or the text contains a large number of ancient poems that are not related to the product, etc. For this kind of comment text, the regular matching method can be used to preprocess the comment text to filter out or remove this kind of comment text. The regular matching method is to set a regular expression in advance and use the regular expression to match the entered comment text. The regular expressions are usually used to retrieve and replace text that matches a pattern. The pattern describes one or more strings to be matched when searching for text, and is a logical formula for operating on strings.

In practical applications, this step may use the following methods to perform the preprocessing:
 a) using at least one regular expression method to match the comment text;
 b) based on a matching result, filtering out sensitive words and/or preset texts in the comment text, such as ancient poetry texts; and
 c) based on the matching result, removing the comment text of which the number of words of the comment text is lower than a set threshold.

Wherein, the at least one regular expression method includes:
 1) using a first regular expression method to match Chinese character information in the comment text; and/or
 2) using a second regular expression method to match non-Chinese character information in the comment text; and/or
 3) using a third regular expression method to match numbers in the comment text; and/or
 4) using a fourth regular expression method to match special characters in the comment text.

That is to say, different regular expressions can be set for Chinese character information, non-Chinese character information, numbers, special characters, etc., and these regular expressions are used to match the comment text entered by the user. In practical applications, any combination of one or more of Chinese, non-Chinese, numbers and special characters may appear in the comment text, so that the matching may be performed by any combination of the above steps 1) to 4).

For example, a regular expression that matches Chinese character information can be expressed as:
 Pattern=u' \u6211.*? \u3002';

A regular expression that matches English text can be expressed as:
 Pattern=re.compile(r' ([a-z]+)([a-z]+)',re.l);

A regular expression that matches numbers can be expressed as:
 Pattern=re.compile (r' \d+').

The above are just examples of a few regular expressions. In fact, the regular expressions can be determined by the user who applies the solution of the embodiment of the present disclosure, as long as a reasonable match can be performed.

Then, the above step b) is used to filter out sensitive words and/or ancient poems. Of course, a sensitive word thesaurus and an ancient poetry text database can be established in advance herein, and the filtering is performed according to the sensitive word thesaurus and the ancient poetry text database. In addition, in practical applications, if the number of words in the comment text is too small and does not exceed the preset word number threshold, resulting in too little information, and the value-in-use of such comment text to other users is not high, it can be removed by step c).

For example, some of the comment texts are shown as follows:

TABLE 1

| sequence number | comment text before preprocessing | comment text after preprocessing |
| --- | --- | --- |
| ... | ... | ... |
| comment 55 | Good! | |
| comment 56 | I really want to buy a fucking pan Phone iXS | I really want to buy a pan Phone iXS |
| comment 57 | When the bright moon be there, wine asked the sky, I do not know the palace in the sky, today evening is what year. Apple Phone is good. | Apple Phone is good. |
| comment 58 | Apple Phone is very easy to use. | Apple Phone is very easy to use. |
| comment 59 | Apple Phone is not as good as Orange Phone. | Apple Phone is not as good as Orange Phone. |
| ... | ... | ... |

It can be seen that after the preprocessing of step M4, the comment 55 with too few words in the text can be removed; the sensitive word "fucking" in the comment 56 is filtered out; the ancient poem "When the bright moon be there, wine asked the sky, I do not know the palace in the sky, today evening is what year" in the comment 57 is also filtered out.

At a step M6, the preprocessed comment text, i.e., the comment text after preprocessing is processed by using word segmentation logic to conduct a word segmentation processing.

In order to facilitate subsequent processing, this embodiment may further perform word segmentation processing on the preprocessed comment text. For example, the stuttering word segmentation tool, which includes full word segmentation mode, precise word segmentation mode, search engine word segmentation mode, etc., can choose the appropriate mode according to the actual situation.

For the comment text described in Table 1, after word segmentation processing, the results are shown in Table 2.

TABLE 2

| sequence number | comment text before word segmentation | comment text after word segmentation |
| --- | --- | --- |
| ... | ... | ... |
| comment 55 | Good! | |
| comment 56 | I really want to buy a pan Phone iXS | I + really want to + buy + a + pan + Phone + iXS |
| comment 57 | Apple Phone is good. | Apple + Phone + is good. |
| comment 58 | Apple Phone is very easy to use. | Apple + Phone + is very easy + to use. |

TABLE 2-continued

| sequence number | comment text before word segmentation | comment text after word segmentation |
| --- | --- | --- |
| comment 59 | Apple Phone is not as good as Orange Phone. | Apple + Phone + is not as good as + Orang + Phone. |
| ... | ... | ... |

For example, comment 57 "Apple Phone is good" is divided or segmented into three word segmentations: "Apple", "Phone" and "is good" after word segmentation. Of course, in practical applications, the results processed by different word segmentation tools may be different, as long as the original complete sentence can be broken down into multiple words.

At a step M8, comment feature values of the comment text are determined according to preset text feature types.

In some embodiments, for the comment text, a value of the comment text regarding to each of the preset text feature types is determined according to the preset text feature types and their value range, and comment feature values of the comment text are determined according to value of the comment text regarding to each of the preset text feature types, wherein the text feature type is used to describe different types of features that the comment text has, and the comment feature values are a collection of specific values determined for respective text feature type of the comment text.

In practical applications, the needs of users are different, and the focuses of browsing product comment information are also different. In response to such personalized requirements, the embodiment of the present disclosure may also determine the comment feature values of the comment text according to the text feature type. The text feature types described herein describe all types of features that the comment text has, and the comment feature values are a collection of specific values determined for respective text feature type of the comment text. For example, for the comment text, the text feature types can be set in advance: 1) emotional feature; 2) text length feature; 3) whether features of ancient poetry are included; 4) click times feature; 5) time effective feature; 6) whether it is set as a best comment feature, etc., the value range of which is shown in Table 3.

TABLE 3

| text feature type | value range | meaning |
| --- | --- | --- |
| emotional feature | positive/neutral/negative | the comment text reflect the emotional tendency of the user |
| text length feature | [0, 500] | the numbers of text characters |
| whether features of ancient poetry are included | Yes/No | whether ancient poetry is included in the comment text? |
| click times feature | [0, 1000000] | The number of times a text comment was clicked by another user |
| time effective feature | --Y--M--D | time that text comment is input |
| whether it is set as a best comment feature | Yes/No | Whether the comment text is voted as the best comment? |
| ... | ... | ... |

Among them, "emotional feature" has three values of "positive/neutral/negative", which is mainly used to reflect the user's emotional tendency when entering the comment text; the value range of "text length feature" can be set by the user, for example, set to [0,500] characters; the value range of "whether features of ancient poetry are included" has two values of "Yes" and "No"; the value range of "click times feature" can be set by the user, for example, set to [0, 1000000]; the value range of "time effective feature" is a specific date or further includes a specific time point, indicating the time when the comment text is entered; the values of "whether it is set as a best comment feature" has two values of "Yes" and "No".

The text feature types are not limited to include the types shown in Table 3, and are set by the user applying the solution of this embodiment. The purpose of setting the text feature type is to describe features of the comment text in more detail, so as to provide users with personalized needs. For example, after the processing in step M8, the comment feature values assigned to the text comment shown in Table 2 above are shown in Table 4:

TABLE 4

| sequence number | comment text | assigned comment feature values |
| --- | --- | --- |
| ... | | |
| comment 55 | | ... |
| comment 56 | I + really want to + buy + a + pan + Phone + iXS | (positive, 13, No, 200, 2019-2-20, No) |
| comment 57 | Apple + Phone + is good. | (positive, 6, Yes, 10, 2019-4-22, No) |
| comment 58 | Apple + Phone + is very easy + to use. | (positive, 8, No, 6, 2019-5-19, Yes) |
| comment 59 | Apple + Phone + is not as good as + Orang + Phone. | (Negative, 10, No, 100, 2019-6-3, No) |
| ... | ... | ... |

Then, when the product comment information is subsequently displayed to the user, it can be selected or screened according to the text feature value, so as to meet the user's personalized needs. For example, if a user needs to browse the comment text after 2019 May 1, the user can screen and display the comments that meet said time effective feature.

At a step M10, the comment text is input into a pre-established text error correction neural network model to perform an error correction processing.

Figure 4:
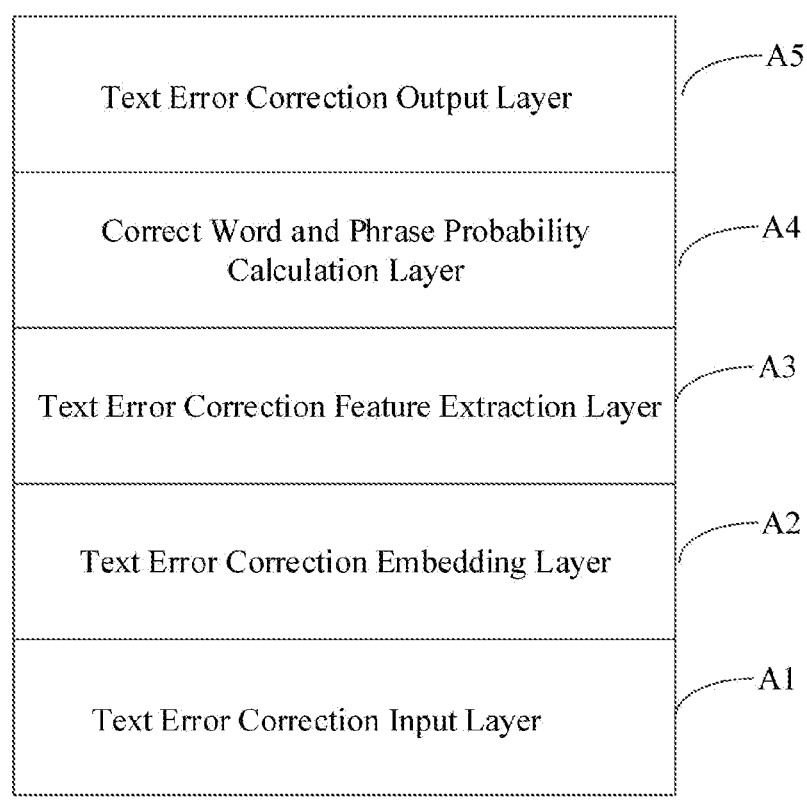
FIG. 4 is a schematic structural diagram of a text error correction neural network model in another embodiments of the present disclosure.
Figure 5:
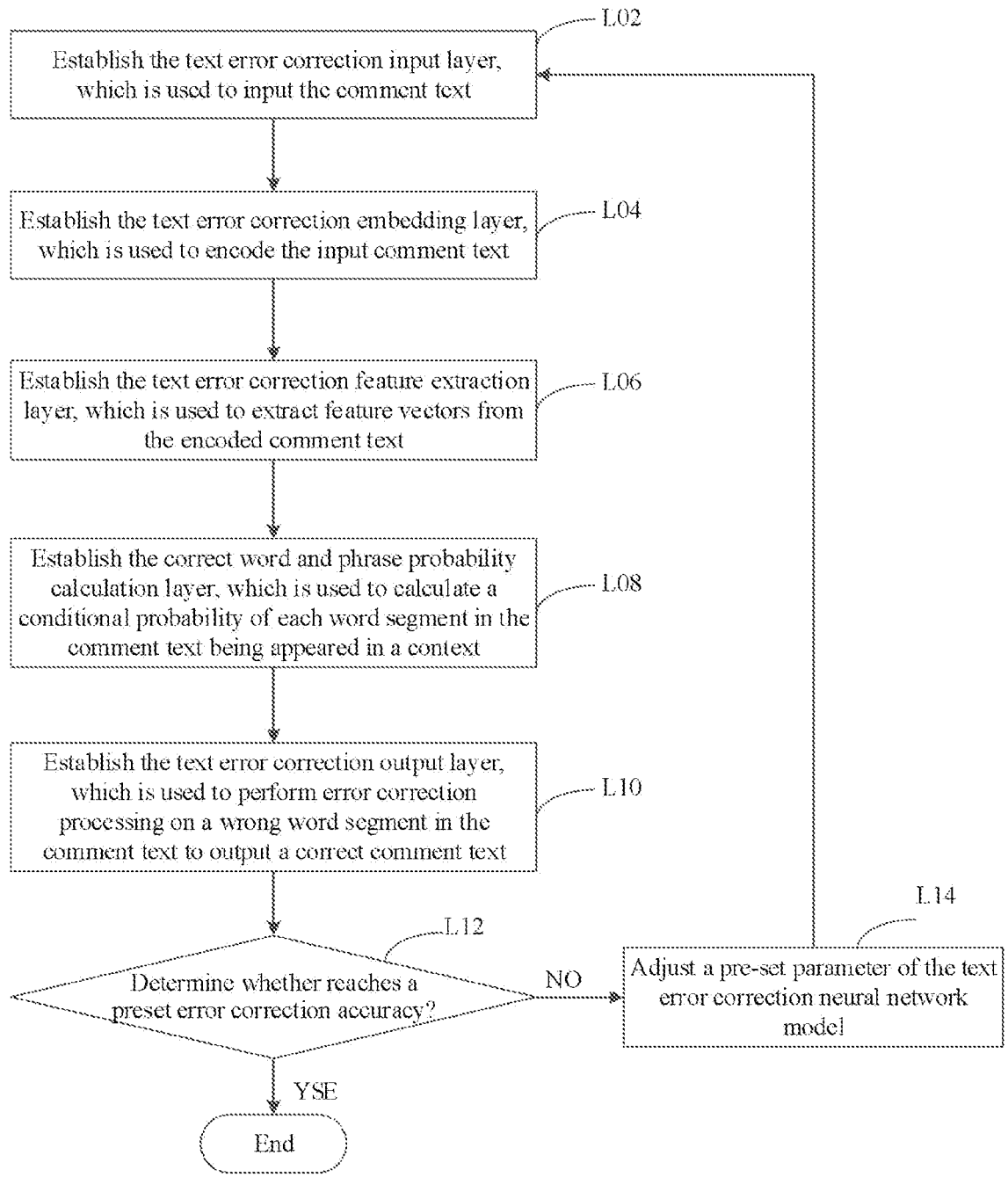
FIG. 5 is a flowchart 500 of a method for establishing a text error correction neural network model in another embodiments of the present disclosure.

The function of this step is to correct the error of the comment text and output the correct comment text. In this embodiment of the present disclosure, a text error correction neural network model may be established in advance, the structure of which is shown in FIG. 4, and the method for establishing the text error correction neural network model is shown in FIG. 5, and the specific method will be described in detail later.

At a step M12, whether the product comment information further includes a comment image is determined, if the product comment information further includes the comment image, a step M14 is performed; and if the product comment information does not include the comment image, a step M16 is performed.

At a step M14, both of the error-corrected comment text and the comment image are input into a pre-established image-text detection neural network model for an image and text consistency detection. In response to detecting that the error-corrected comment text and the comment image are consistent, the product comment information is saved in the display list.

Figure 6:
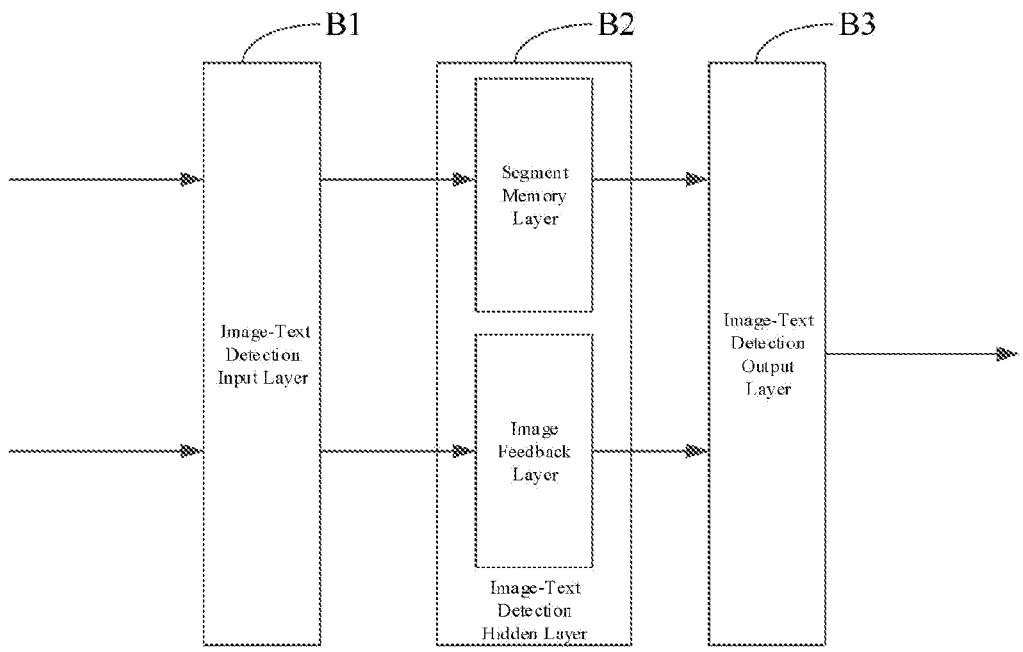
FIG. 6 is a schematic structural diagram of a neural network model for image and text detection in another embodiments of the present disclosure.
Figure 7:
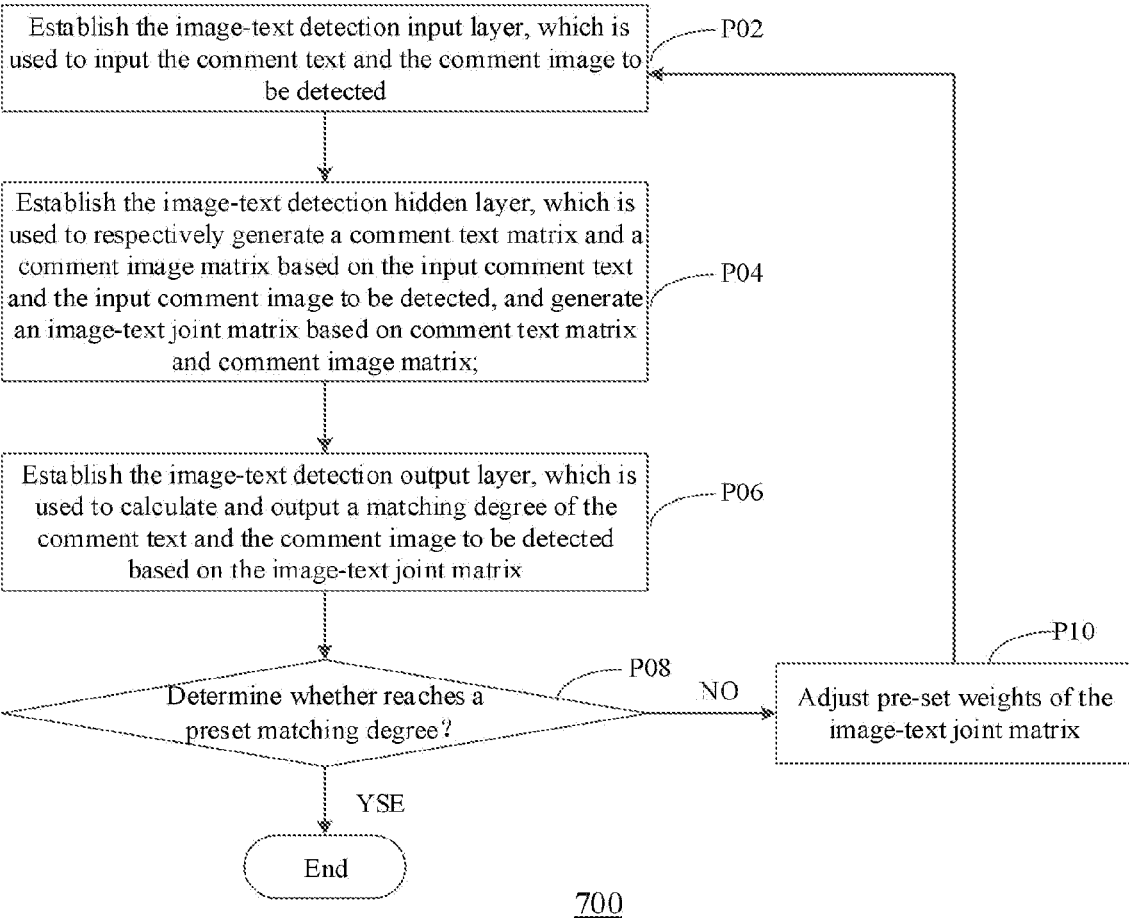
FIG. 7 is a flowchart 700 of a method for establishing a neural network model for image and text detection in another embodiments of the present disclosure.

The role of this step is to perform consistency detection on the comment text and the comment image. In this embodiment of the present disclosure, a neural network model for the image-text detection may be established in advance, the structure of which is shown in FIG. 6, and the method for establishing the neural network model is shown in FIG. 7, and will be described in greater detail later.

At a step M16, the error-corrected comment text is saved in the display list.

So far, the product comment information that should be displayed to the user has been saved in the display list, and all of the product comment information can be displayed to the user, or can be screened according to the following steps M18 to M24 for the personalized display.

At a step M18, personalized comment demand information of the user is acquired, wherein the personalized comment demand information includes the comment feature values.

At a step M20, according to the comment feature values included in the personalized comment demand information, the comment text that conforms to the comment feature values is determined from the display list.

At a step M22, the product comment information corresponding to the determined comment text is screened out and called as the screened product comment information.

At a step M24, the screened product comment information is returned to the user terminal so that it can be displayed to the user.

The personalized comment demand information of the user in the above steps M18~M24 may be directly provided by the user, or may be automatically determined according to the features of the product comment information that the user browsed, in order to get the demand of the user. For example, the user can be provided with options of comment feature values in advance, and the personalized comment demand information of the user can be determined by the user's selection. If the user selects "emotional feature"="positive" and "click times feature"="500", it can be determined that the user may be a user with positive emotional tendencies and likes to refer to hot comments, and the product comment information that meet such requirements will be screened out and provided to the user, which is more appropriate. For another example, the personalized comment demand information of user can be determined by tracking the product comment information browsed by the user. If the user always browses the comment text containing the word "night scene", it can be determined that the user may be interested in the "night scene" shooting function of the mobile phone, and the product comment information containing the word "night scene" can be provided to the user.

In another embodiment of the present disclosure, as shown in FIG. 4, the text error correction neural network model includes: a text error correction input layer A1, a text error correction embedding layer A2, a text error correction feature extraction layer A3, and a correct word and phrase probability calculation layer A4 and a text error correction output layer A5.

FIG. 5 is a method for establishing a text error correction neural network model according to some embodiments of the present disclosure. The method includes following steps.

At a step L02, a text error correction input layer is established, and the text error correction input layer is used for inputting the comment text.

At a step L04, a text error correction embedding layer is established, wherein the text error correction embedding layer is used to encode the input comment text.

Since the content input by the user is text, it needs to be encoded to become a computer-recognized encoding sequence. For example, one-hot encoding or word2vector encoding and so on can be used for encoding.

At a step L06, a text error correction feature extraction layer is established, and the text error correction feature extraction layer is used to extract feature vectors from the encoded comment text.

In this step, there are many methods for extracting feature vectors from the encoded comment text, such as convolution or gate sequence LSTM, etc., and both of convolution and gate sequence LSTM can also be used together to extract feature vectors from the comment text.

At a step L08, a correct word and phrase probability calculation layer is established, the correct word and phrase probability calculation layer is used to calculate a conditional probability of each word segment in the comment text being appeared in a context.

In this step, the feature vector of the extracted comment text will be involved in the calculation of the correct word and phrase probability. The meaning of the correct word and phrase probability is the conditional probability of each word segment appearing in the context. In practical applications, a sliding window can be set on the basis of the Markov hypothesis, and then the N-gram method can be used to calculate the probability of the current word segment appearing in the context.

Among them, the meaning of the Markov hypothesis is that the probability of occurrence of any word segment is only related to one or more word segments that appear before the current word segment, and is not related to any other word segments. The set sliding window is used to determine that how many word segments before the current word segment are related to the current word segment. For example, if the current word segment is related to the previous two word segments, the sliding window can be set to 2, and so on. N-gram is a language model for continuous recognition of large vocabulary, commonly used are binary Bi-gram and ternary Tri-gram. In practical applications, when the calculated conditional probability is lower than the preset threshold, it can be considered that the current word segment is wrong and needs to be corrected; otherwise no error correction is required. For example, if the conditional probability of a certain word segment is calculated to be less than 0.85, it is judged that the word segment has an error and needs to be corrected.

At a step L10, a text error correction output layer is established; the text error correction output layer is used to perform the error correction processing on a wrong word segment in the comment text, and output the corrected comment text (i.e., the right comment text).

When the step above calculates that the conditional probability of the current word segment appearing in the context is lower than the set threshold, error correction can be performed in this step. The method of error correction can use pre-built word lists and phrase lists for error correction. The word lists include spelling and all Chinese character sets corresponding to the spelling. The corresponding Chinese character set can be used as candidate word segments. The Levenstein method is used to calculate edit distances, and the smallest distance among the edit distances is selected as an error correction result. The word list includes correct word segment and corresponding possibly wrong word segments. After searching the word lists and matching the wrong word, the corresponding correct word segment can be used as the error correction result.

At a step L12, whether the text error correction neural network model reaches a preset error correction accuracy is determined, if the preset error correction accuracy is reached, the method for establishing the text error correction neural network model is ended; otherwise, a step L14 is performed.

At a step L14, pre-set parameters of the text error correction neural network model are adjusted, and the process is returned to the step L02.

In practical applications, when constructing an error correction neural network model, it is necessary to continuously train the model until it is stable and reaches the preset error correction accuracy. If the requirements are not met, the model parameters need to be adjusted, such as the sliding window, the error correction accuracy, Levenstein parameters, etc., and then it is returned to the step L02 for training.

In another embodiment of the present disclosure, as shown in FIG. 6, the image-text detection neural network model includes: an image-text detection input layer B1, an image-text detection hidden layer B2, and an image-text detection output layer B3. The method for establishing the image-text detection neural network model shown in FIG. 7 includes the following steps.

At a step P02, an image-text detection input layer is established; the image-text detection input layer is used to input the comment text and the comment image to be detected.

In this step, after inputting the comment text and comment image, it is necessary to further encode the comment text by using the Bert method, and encode the comment image by using the Resnet neural network algorithm, so that the text and image become computer-recognizable mathematical vectors.

At a step P04, an image-text detection hidden layer established, the image-text detection hidden layer is used to respectively generate a comment text matrix and a comment image matrix according to the input comment text and comment image to be detected, and further generate an image-text joint matrix according to the comment text matrix and the comment image matrix.

In this step, a segment memory layer and an image feedback layer can be included in the hidden layer. The segment memory layer uses an attention mechanism to determine the key attention parts of the comment text, generates a comment text matrix from the encoded comment text. The image feedback layer generates a comment image matrix by using the encoded comment image, and generates the image-text joint matrix. In practice, the rows of these two matrices can be set as vectors having the same dimension. When calculating the image-text joint matrix, a dot product calculation is performed on the vectors of the two matrices to obtain a joint matrix containing text and image information. In addition, a larger weight may be set in the corresponding elements in the joint matrix, and a smaller weight may be set in the elements of other parts, so as to reflect different importance degrees of the information.

At a step P06, an image-text detection output layer is established, which is used for calculating and outputting a matching degree of the comment text and the comment image to be detected according to the image-text joint matrix.

In practical applications, it is assumed that the calculation of the matching degree is expressed by the following formula 1:

$$Y = WX + b \qquad \text{(formula 1)}$$

wherein, W represents an image-text joint matrix parameter, b represents a set correction parameter, X represents the input comment text and comment image, and Y represents the calculated matching degree.

At a step P08, whether the image-text detection neural network model reaches a preset matching degree is determined, and if the preset matching degree is reached, the method for establishing the image-text detection neural network model is ended; otherwise, a step P10 is performed.

At a step P10, pre-set weights of the image-text joint matrix are adjusted, and then return to perform the step P04.

In the embodiment of the present disclosure, the product comment information input by the user is subjected to preprocessing, error correction processing, and image-text consistency detection processing, and the user is provided with personalized demands through the comment feature values, which not only improves the quality of product comment information, but also satisfies the user's personalized demands, and the experience effect is better.

Figure 8A:
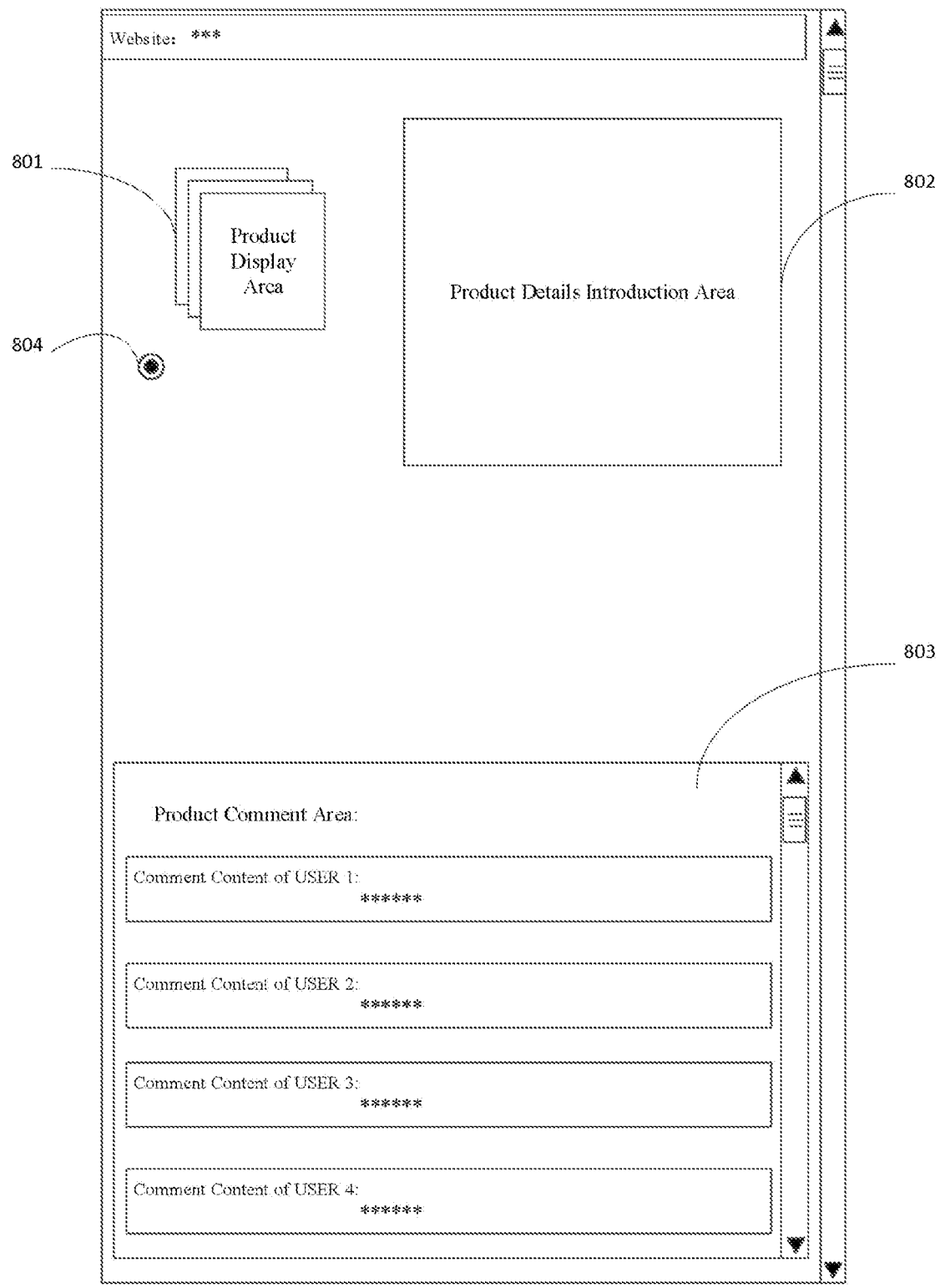
FIGS. 8A and 8B are schematic diagrams of a product details page mode according to another embodiments of the present disclosure.
Figure 8B:
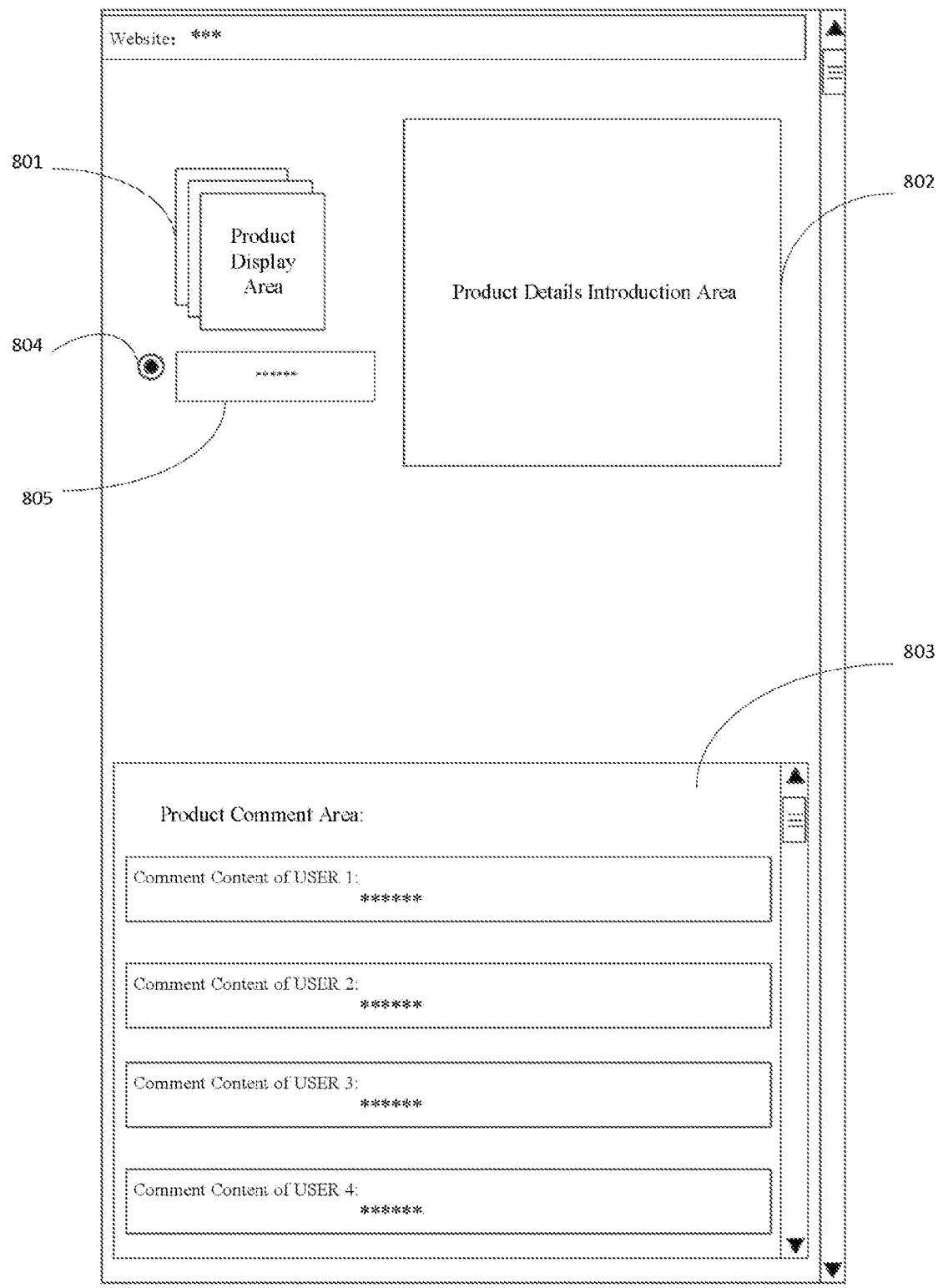

In practical applications, the methods shown in FIG. 8A and FIG. 8B can be used to display. FIGS. 8A and 8B are product details page modes of another embodiments of the present disclosure, each includes: a product display area 801, which uses pictures or videos to display the appearance or usage of a product; a product detail introduction area 802, which details the price, performance, parameters and other information; the product comment area 803, which displays the user's evaluation on the product. Different from FIG. 1, in this embodiment, a button control 804 may be added in FIG. 8A to provide a personalized display for the user. In practical applications, the button control 804 can be implemented by a plug-in, and can be closed when the personalized display is not required. If the user requests the personalized display, the button control 804 can be clicked and a presentation box 805 will open. The presentation box 805 can take turns playing the product comment information screened out for the user, so as to provide personalized demands.

Figure 9A:
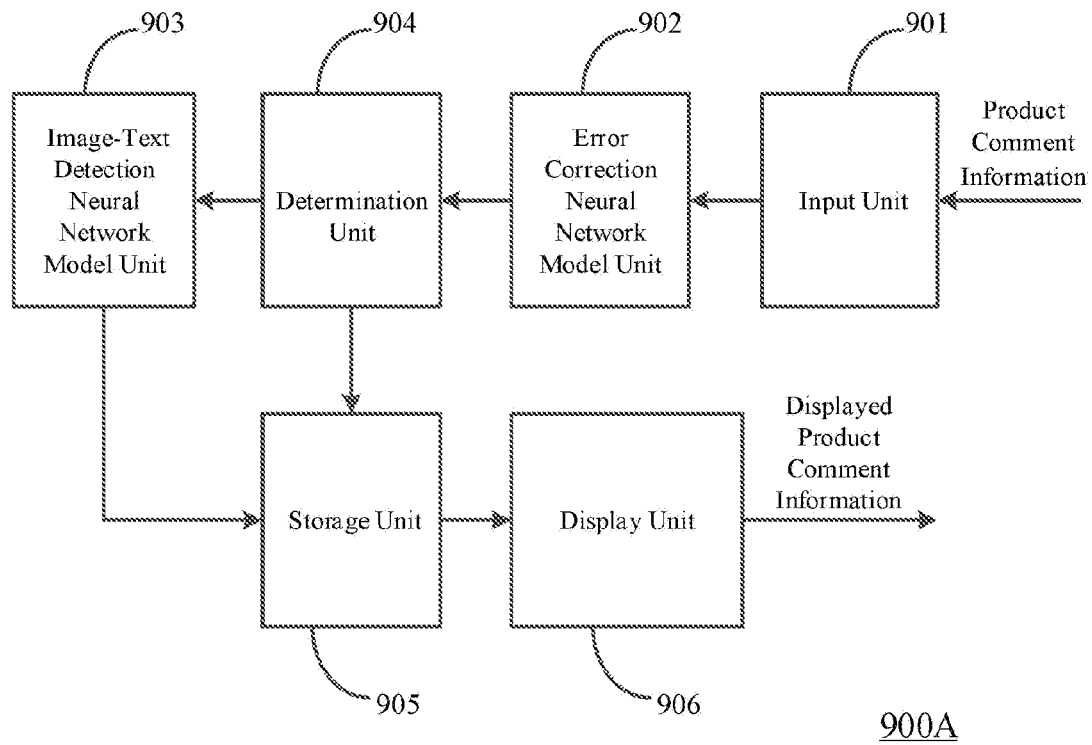
FIG. 9A is a schematic structural diagram 900A of an apparatus for displaying product comment information according to another embodiments of the present disclosure.

Another embodiment of the present disclosure provides an apparatus for displaying product comment information. As shown in FIG. 9A, the apparatus includes an input unit 901, an error correction neural network model unit 902, an image-text detection neural network model unit 903, a determination unit 904, a storage unit 905, and a display unit 906.

The input unit 901 is configured to acquire product comment information of a user, wherein the product comment information comprises a comment text.

The error correction neural network model unit 902 is configured to input the comment text into a pre-established first model for an error correction processing.

The image-text detection neural network model unit 903 is configured to perform an image-text consistency detection, and in response to detecting that the comment text and a comment image are consistent, save the product comment information having the consistent comment text and comment image into a display list of a storage unit.

The determination unit 904 configured to determine whether the product comment information comprises a comment image, in response to determining that the product comment information comprises the comment image, inputting both of the error-corrected comment text and the comment image together into a second model, and in response to determining that the product comment information does not comprise the comment image, saving the error-corrected comment text directly in the display list of the storage unit.

The storage unit 905 is configured to save the display list.

The display unit 906 is configured to display the product comment information in the display list to the user.

That is to say, the input unit 901 acquires the user's product comment information, and inputs the comment text to the text error correction neural network model unit 902 for error correction processing; the determination unit 904 determines whether the product comment information includes the comment image, if determining that the product comment information comprises the comment image, inputting both of the error-corrected comment text and the comment image together into the image-text detection neural network model unit 903; if determining that the product comment information does not comprise the comment image, saving the error-corrected comment text directly in the display list of the storage unit 905. After the processing is completed, the display unit 906 displays the product comment information in the display list to the user. The error correction neural network model unit 902, the image-text detection neural network model unit 903 and the display unit 906 can be implemented by using the solutions described in the above method part.

Figure 9B:
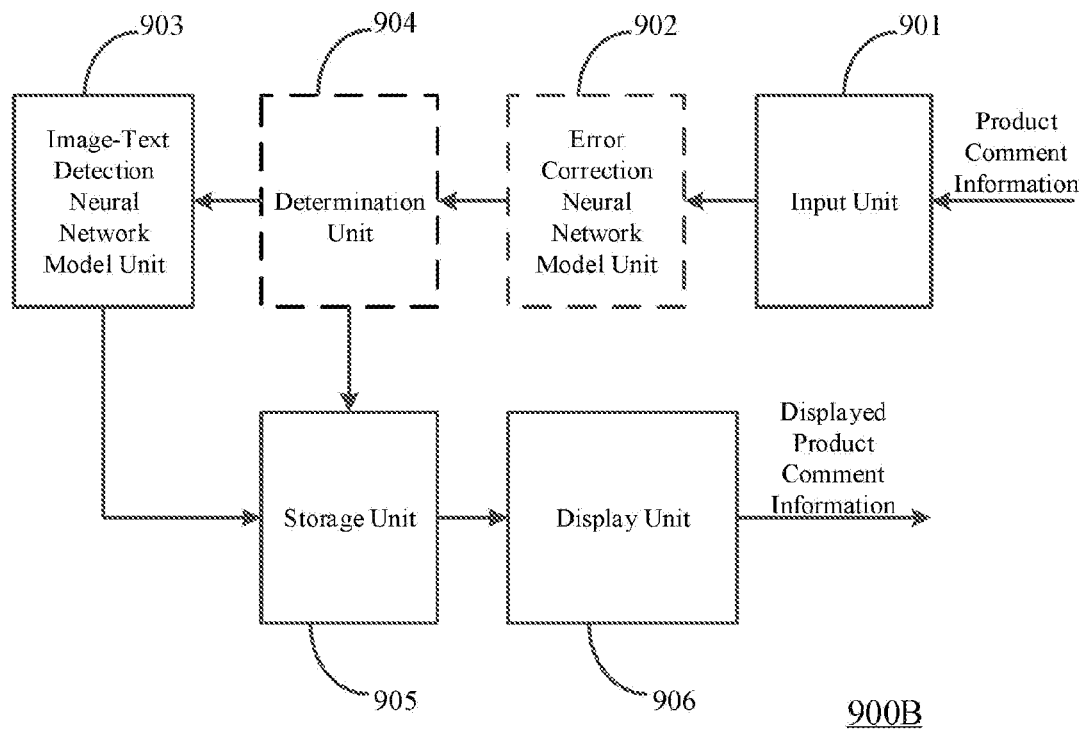
FIG. 9B is a schematic structural diagram 900B of an apparatus for displaying product comment information according to another embodiments of the present disclosure.

Another embodiment of the present disclosure further provides an apparatus for displaying product comment information. As shown in FIG. 9B, the apparatus includes an input unit 901, an image-text detection neural network model unit 903, a storage unit 905, and a display unit 906.

The input unit 901 is configured to acquire product comment information of a user, wherein the product comment information comprises a comment text.

The image-text detection neural network model unit 903 is configured to, in response to determining that the product comment information further comprises a comment image, input both of the comment text and the comment image together into a pre-established first model for an image-text consistency detection, and in response to detecting that the comment text and the comment image are consistent, save the product comment information having the consistent comment text and comment image into a display list of a storage unit.

The storage unit 905 is configured to save the display list.

The display unit 906 is configured to return the product comment information in the display list to a user terminal to display to the user.

In some embodiments, the apparatus for displaying product comment information further includes a determination unit 904, which is configured to determine whether the product comment information further comprises a comment image.

In some embodiments, the apparatus for displaying product comment information further includes an error correction neural network model unit 902, which is configured to input the comment text into a pre-established second model for an error correction processing.

The image-text detection neural network model unit 903 is further configured to input both of the error-corrected comment text and the comment image together into the first model for the image-text consistency detection.

In some embodiments, the storage unit 905 is further configured to directly save the error-corrected comment text in the display list when the product comment information does not include the comment image.

Figure 10:
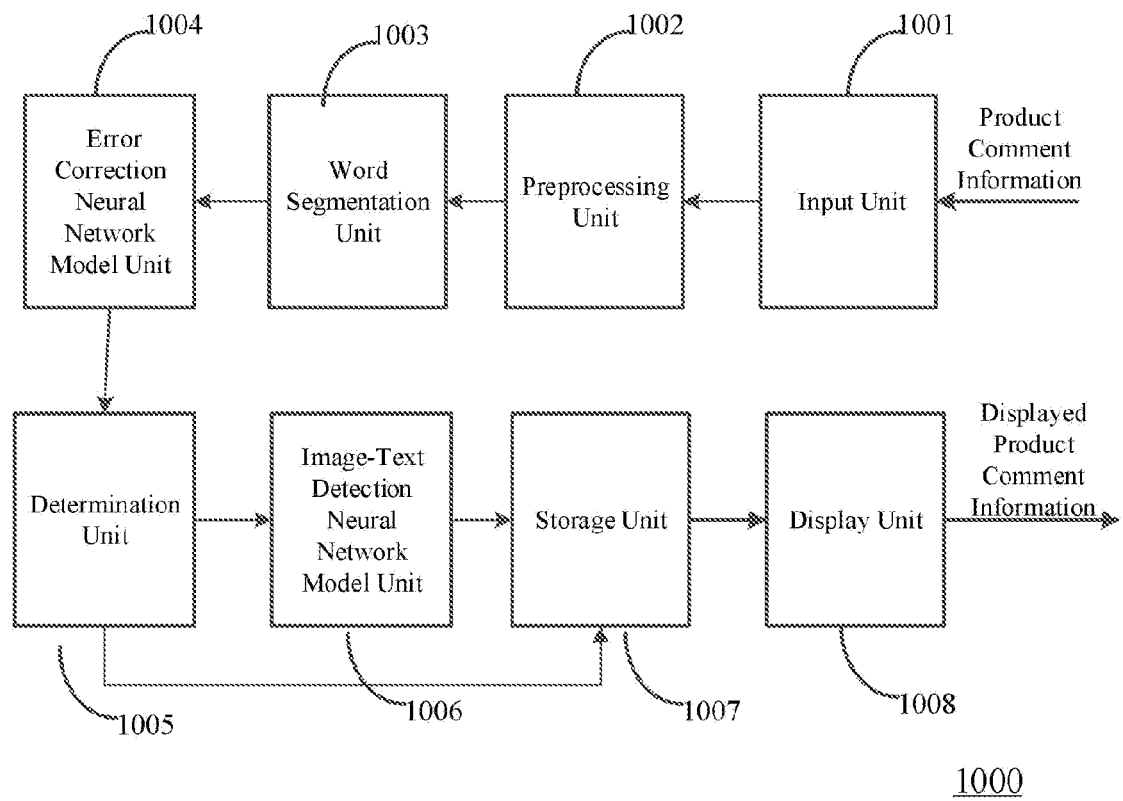
FIG. 10 is a schematic structural diagram 1000 of an apparatus for displaying product comment information according to another embodiments of the present disclosure.

The present disclosure also proposes another embodiment of a display device for realizing product comment information. As shown in FIG. 10, the display device includes an input unit 1001, a preprocessing unit 1002, a word segmentation unit 1003, an error correction neural network model unit 1004, a determination unit 1005, an image-text detection neural network model unit 1006, a storage unit 1007, and a display unit 1008. The input unit 1001, the error correction neural network model unit 1004, the image-text detection neural network model unit 1006, the determination unit 1005, the storage unit 1007, and the display unit 1008 are the same as the corresponding units in FIG. 9, and will not be repeated here.

The preprocessing unit 1002 is configured to preprocess the comment text by using a regular matching method.

The word segmentation unit 1003 performs a word segmentation processing on the preprocessed comment text by using the word segmentation logic and determines comment feature values of the comment text according to preset text feature types.

In some embodiments, the preprocessing unit 1002 is further configured to, for the comment text, determine a value of the comment text regarding to each of the preset text feature types according to the preset text feature types and their value range, and determine comment feature values of the comment text according to value of the comment text regarding to each of the preset text feature types, wherein the text feature type is used to describe different types of features that the comment text has, and the comment feature values are a collection of specific values determined for respective text feature type of the comment text That is to say, the input unit 1001 obtains the user's product comment information and inputs the comment text into the preprocessing unit 1002, and the preprocessing unit 1002 preprocesses the comment text by using a regular matching method, and filters out sensitive words or preset texts, such as ancient poems, and removes the comment text whose number of words is less than the threshold; the word segmentation unit 1003 uses the word segmentation logic to perform word segmentation processing on the preprocessed comment text, and determines the comment feature value of the comment text according to the text feature type set in advance, then inputs the comment text to the text error correction neural network model unit 1004 for error correction processing; the determination unit 1005 determines whether the product comment information further includes a comment image, if the product comment information includes the comment image, then the error-corrected comment text and the comment image are together input into the image-text detection neural network model unit 1006; if the product comment information does not include the comment image, the error-corrected comment text is directly stored in the display list in the storage unit 1007. After the processing is completed, the display unit 1007 obtains the personalized comment demand information of the user, the personalized comment demand information includes comment feature values, and the comment text that conforms to the comment feature value is determined from the display list according to the comment feature values included in the personalized comment demand information, the product comment information corresponding to the determined comment text is screened out and used as the screened product comment information, and the screened product comment information is returned to the user terminal to be displayed to the user.

The present disclosure also provides an embodiment of a computer-readable storage medium, wherein the computer-readable storage medium stores instructions, when executed by a processor, cause the processor to execute the steps of the above-described method for displaying product comment information. In practical applications, the computer-readable medium may be included in the device/apparatus/system described in the above embodiments, or may exist alone without being assembled into the device/apparatus/system. The above-mentioned computer-readable storage medium carries one or more programs, and when the above-mentioned one or more programs are executed, the method shown in FIG. 2, FIG. 3, FIG. 5 or FIG. 7 can be implemented.

According to the embodiments disclosed in the present disclosure, the computer-readable storage medium may be a non-volatile computer-readable storage medium, such as, but not limited to, portable computer disks, hard disks, random access memory (RAM), read only memory (ROM), erasable programmable read-only memory (EPROM or flash memory), portable compact disk read-only memory (CD-ROM), optical storage devices, magnetic storage devices, or any suitable combination of the above, but are not intended to limit the protection scope of the present application. In the embodiments disclosed in the present application, a computer-readable storage medium may be any tangible medium that contains or stores a program that can be used by or in conjunction with the system, apparatus, or device executing the instruction.

Figure 11:
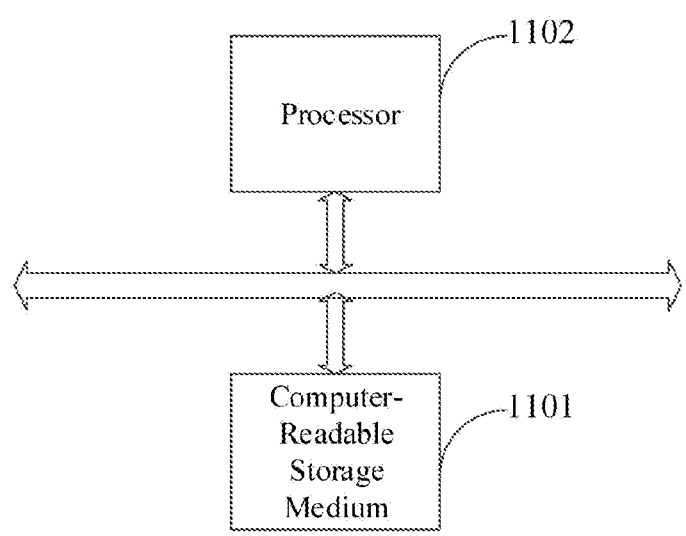
FIG. 11 is a schematic structural diagram 1100 of an electronic device according to some embodiments of the present disclosure.

As shown in FIG. 11, an embodiment of the present disclosure further provides an electronic device, and the electronic device may be a server that executes the method for displaying product comment information in the embodiment of the present disclosure. The electronic device includes the computer-readable medium 1101 described above, and further includes a processor 1102 that can execute the computer-readable storage medium. In practical applications, the electronic device may be one or more computers, as long as it includes the above-mentioned computer-readable medium and the processor.

In addition, the method steps described in the present application can be implemented by hardware in addition to data processing programs, for example, can be implemented by logic gates, switches, application specific integrated circuits (ASICs), programmable logic controllers and embedded microcontrollers, etc. Therefore, the hardware that can implement the method described in the present disclosure can also constitute the present disclosure.

The flowchart and block diagrams in the figures of the present disclosure illustrate the architecture, functionality, and operation of possible implementations of systems, methods and computer program products according to various embodiments disclosed herein. In this regard, each block in the flowchart or block diagrams may represent a module, segment, or portion of code that contain executable instructions for implementing the specified logical function(s). It should also be noted that, in some alternative implementations, the functions noted in the blocks may occur in an order which is different from that noted in the figures. For example, two blocks shown in connection may, in fact, be executed substantially concurrently, or the blocks may sometimes be executed in the reverse order, depending upon the functionality involved. It is also noted that each block of the block diagrams or flowchart illustrations, and combinations of blocks in the block diagrams or flowchart illustrations can be implemented in special purpose hardware-based systems that perform the specified functions or operations, or can be implemented using a combination of dedicated hardware and computer instructions.

Those skilled in the art will appreciate that various combination(s) of features recited in the various embodiments of the present disclosure and/or claims are possible, even if such combinations or combinations are not explicitly described in this application. In particular, various combination(s) of the features recited in the various embodiments of the present disclosure and/or the claims may be made without departing from the spirit and teachings of the present disclosure, all such combination(s) falls within the scope of the present disclosure.

The principles and implementations of the present disclosure are described herein by using specific embodiments. The descriptions of the above embodiments are only used to help understand the methods and core ideas of the present disclosure, and are not intended to limit the present disclosure. For those skilled in the art, modifications can be made in the specific embodiments and application scope according to the ideas, spirit and principles of the present disclosure, and any modifications, equivalent replacements, improvements, etc. made by them should be included within the protection scope of the present disclosure.

What is claimed is:

1. A method for displaying product comment information, executed by a server and comprising:
   acquiring product comment information of a user, wherein the product comment information comprises a comment text;
   inputting the comment text into a pre-established first model for an error correction processing;
   determining whether the product comment information further comprises a comment image;
   in response to determining that the product comment information further comprises the comment image, inputting both of the error-corrected comment text and the comment image together into a pre-established second model for an image-text consistency detection, and in response to detecting that the error-corrected comment text and the comment image are consistent, saving the product comment information having the consistent comment text and comment image into a display list;
   in response to determining that the product comment information does not comprise the comment image, saving the error-corrected comment text directly in the display list; and
   displaying the product comment information in the display list to the user;
   wherein after conducting a word segmentation on a pre-processed comment text by using a word segmentation logic, the method further comprises:
   for the comment text, determining a value of the comment text regarding to each of preset text feature types based on the preset text feature types and value ranges corresponding to respective preset text feature types, and determining comment feature values of the comment text based on values of the comment text regarding to respective text feature types,
   wherein the text feature type is used to describe different types of features that the comment text has, and the comment feature values are a collection of specific values determined for respective text feature types of the comment text; and
   wherein the displaying the product comment information in the display list to the user comprises:
   acquiring personalized comment demand information of the user, wherein the personalized comment demand information comprises the comment feature values;
   based on the comment feature values contained in the personalized comment demand information, determining a comment text that conforms to the comment feature values from the display list;
   screening out product comment information corresponding to the determined comment text that conforms to the comment feature values to generate the screened product comment information; and
   returning the screened product comment information to a user terminal to display to the user.

2. The method according to claim 1, wherein after acquiring the product comment information of the user, the method further comprises:
   pre-processing the comment text by using a regular matching method to obtain the pre-processed comment text.

3. The method according to claim 2, wherein the pre-processing the comment text by using the regular matching method comprises:
   matching the comment text by using at least one regular expression method;
   filtering out at least one of sensitive words or preset texts in the comment text based on a matching result; and
   removing a comment text filtered of which a number of words of the comment text filtered is lower than a set threshold.

4. The method according to claim 3, wherein the matching the comment text by using the at least one regular expression method comprises at least one of:
   using a first regular expression method to match Chinese character information in the comment text;
   using a second regular expression method to match non-Chinese character information in the comment text;
   using a third regular expression method to match numbers in the comment text; or
   using a fourth regular expression method to match special characters in the comment text.

5. The method according to claim 1,
   wherein the first model comprises a text error correction input layer, a text error correction embedding layer, a text error correction feature extraction layer, a correct word and phrase probability calculation layer, and a text error correction output layer;
   wherein establishing of the first model comprises following steps:
   establishing the text error correction input layer, wherein the text error correction input layer is used to input the comment text;
   establishing the text error correction embedding layer, wherein the text error correction embedding layer is used to encode the input comment text inputted;
   establishing the text error correction feature extraction layer, wherein the text error correction feature extraction layer is used to extract feature vectors from the comment text encoded;
   establishing the correct word and phrase probability calculation layer, wherein the correct word and phrase probability calculation layer is used to calculate a conditional probability of each word segment in the comment text being appeared in a context;
   establishing the text error correction output layer, wherein the text error correction output layer is used to perform error correction processing on a wrong word segment in the comment text, and outputting a correct comment text; and
   determining whether the first model reaches a preset error correction accuracy,
   in response to determining that the first model reaches the preset error correction accuracy, ending the establishing of the first model, and
   in response to determining that the first model does not reach the preset error correction accuracy, adjusting a pre-set parameter of the first model, and returning to re-execute a step of establishing the text error correction input layer.

6. The method according to claim 1,
wherein the second model comprises an image-text detection input layer, an image-text detection hidden layer and an image-text detection output layer;
wherein establishing of the second model comprises following steps:
   establishing the image-text detection input layer, wherein the image-text detection input layer is used to input the comment text to be detected and the comment image to be detected;
   establishing the image-text detection hidden layer, wherein the image-text detection hidden layer is used to generate a comment text matrix and a comment image matrix respectively according to the comment text to be detected and the comment image to be detected that are inputted, and generating an image-text joint matrix according to the comment text matrix and the comment image matrix;
   establishing the image-text detection output layer, wherein the image-text detection output layer is used to calculate and output a matching degree of the comment text to be detected and the comment image to be detected, according to the image-text joint matrix; and
   determining whether the second model reaches a preset matching degree,
   in response to determining that the second model reaches the preset matching degree, ending the establishing of the second model, and
   in response to determining that the second model dose not reach the preset matching degree, adjusting preset weights of the image-text joint matrix and returning to re-execute a step of establishing the image-text detection hidden layer.

7. A method for displaying product comment information, executed by a server and comprising:
   acquiring product comment information of a user, wherein the product comment information comprises a comment text;
   in response to determining that the product comment information further comprises a comment image, inputting both of the comment text and the comment image together into a pre-established first model for an image-text consistency detection, and in response to detecting that the comment text and the comment image are consistent, saving the product comment information having the consistent comment text and comment image into a display list; and
   returning the product comment information in the display list to a user terminal to display to the user;
   wherein after conducting a word segmentation on a pre-processed comment text by using a word segmentation logic, the method further comprises:
   for the comment text, determining a value of the comment text regarding to each of preset text feature types based on the preset text feature types and value ranges corresponding to respective preset text feature types, and determining comment feature values of the comment text based on values of the comment text regarding to respective text feature types,
   wherein the text feature type is used to describe different types of features that the comment text has, and the comment feature values are a collection of specific values determined for respective text feature types of the comment text; and wherein returning the product comment information in the display list to the user terminal to display to the user comprises:
   acquiring personalized comment demand information of the user, wherein the personalized comment demand information comprises the comment feature values;
   based on the comment feature values contained in the personalized comment demand information, determining a comment text that conforms to the comment feature values from the display list;
   screening out product comment information corresponding to the determined comment text that conforms to the comment feature values to generate the screened product comment information; and
   returning the screened product comment information to the user terminal to display to the user.

8. The method according to claim 7, wherein after acquiring the product comment information of the user, the method further comprises:
   inputting the comment text into a pre-established second model for an error correction processing;
   wherein the inputting both of the comment text and the comment image together into the pre-established first model for the image-text consistency detection comprises:
   inputting both of the error-corrected comment text and the comment image together into the first model for the image-text consistency detection.

9. The method according to claim 8, further comprising:
   in response to determining that the product comment information does not comprise the comment image, saving the error-corrected comment text directly in the display list.

10. The method according to claim 7, wherein after acquiring the product comment information of the user, the method further comprises:
   pre-processing the comment text by using a regular matching method to obtain the pre-processed comment text.

11. The method according to claim 10, wherein the pre-processing the comment text by using the regular matching method comprises:
   matching the comment text by using at least one regular expression method;
   filtering out at least one of sensitive words or preset texts in the comment text based on a matching result; and
   removing a comment text filtered of which a number of words of the comment text filtered is lower than a set threshold.

12. An electronic device, comprising: a memory, a processor and a computer program stored in the memory and executable on the processor, when the processor is configured to:
   acquire product comment information of a user, wherein the product comment information comprises a comment text;
   input the comment text into a pre-established first model for an error correction processing;
   determine whether the product comment information further comprises a comment image;
   in response to determining that the product comment information further comprises the comment image, input both of the error-corrected comment text and the comment image together into a pre-established second model for an image-text consistency detection, and in response to detecting that the error-corrected comment text and the comment image are consistent, save the product comment information having the consistent comment text and comment image into a display list;

in response to determining that the product comment information does not comprise the comment image, save the error-corrected comment text directly in the display list; and display the product comment information in the display list to the user;

wherein the processor is further configured to:

for the comment text, determine a value of the comment text regarding to each of preset text feature types based on the preset text feature types and value ranges corresponding to respective preset text feature types, and determine comment feature values of the comment text based on values of the comment text regarding to respective text feature types, wherein the text feature type is used to describe different types of features that the comment text has, and the comment feature values are a collection of specific values determined for respective text feature types of the comment text; and wherein the processor is further configured to:

acquire personalized comment demand information of the user, wherein the personalized comment demand information comprises the comment feature values;

based on the comment feature values contained in the personalized comment demand information, determine a comment text that conforms to the comment feature values from the display list;

screen out product comment information corresponding to the determined comment text that conforms to the comment feature values to generate the screened product comment information; and return the screened product comment information to the user terminal to display to the user.

13. The electronic device according to claim 12, wherein the processor is further configured to:

pre-process the comment text by using a regular matching method to obtain the pre-processed comment text.

14. The electronic device according to claim 13, wherein the processor is configured to:

match the comment text by using at least one regular expression method;

filter out at least one of sensitive words and/or or preset texts in the comment text based on a matching result; and remove a comment text filtered of which a number of words of the comment text filtered is lower than a set threshold.

15. The electronic device according to claim 12, wherein the first model comprises a text error correction input layer, a text error correction embedding layer, a text error correction feature extraction layer, a correct word and phrase probability calculation layer, and a text error correction output layer;

wherein the processor is configured to:

establish the text error correction input layer, wherein the text error correction input layer is used to input the comment text;

establish the text error correction embedding layer, wherein the text error correction embedding layer is used to encode the comment text inputted;

establish the text error correction feature extraction layer, wherein the text error correction feature extraction layer is used to extract feature vectors from the comment text encoded;

establish the correct word and phrase probability calculation layer, wherein the correct word and phrase probability calculation layer is used to calculate a conditional probability of each word segment in the comment text being appeared in a context;

establish the text error correction output layer, wherein the text error correction output layer is used to perform error correction processing on a wrong word segment in the comment text, and outputting a correct comment text; and determine whether the first model reaches a preset error correction accuracy, in response to determining that the first model reaches the preset error correction accuracy, end establishing of the first model, and in response to determining that the first model does not reach the preset error correction accuracy, adjust a pre-set parameter of the first model, and returning to re-execute a step of establishing the text error correction input layer.

* * * * *